United States Patent Office 3,641,156
Patented Feb. 8, 1972

3,641,156
JUVABIONE AND DERIVATIVES THEREOF
Beverly Ann Pawson, Montclair, and Gabriel Saucy, Essex Falls, N.J., assignors to Hoffmann-La Roche Inc., Nutley, N.J.
No Drawing. Continuation-in-part of application Ser. No. 725,208, Apr. 29, 1968. This application Mar. 3, 1969, Ser. No. 803,964
Int. Cl. C07c 49/61
U.S. Cl. 260—586         6 Claims

ABSTRACT OF THE DISCLOSURE

This invention is directed to a method of synthesizing Juvaboine and novel derivatives thereof which are useful in killing and preventing proliferation of insects by upsetting their hormone balance including itermediates in this process.

CROSS REFERENCE TO RELATED APPLICATIONS

This application is a continuation-in-part application of Ser. No. 725,208, filed Apr. 29, 1968 now abandoned.

BACKGROUND OF THE INVENTION

The activity of a compound of the formula:

(4R 1'S)

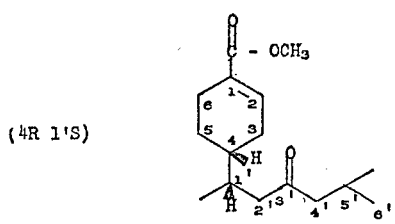

for upsetting the hormone balance of insects to prevent them from growing and reproducing, is well known. Furthermore, the use of this compound as an insecticide has stirred great interest since while this compound is effective in killing insects by upsetting their hormone balance, this compound is considered harmless to animals that are of a higher order than insects.

Heretofore, natural (+) juvabione, which is a stereoisomer of compounds of Formula I above, has not been produced synthetically but has only been produced by isolation from balsam fir. This procedure has proven to be rather disadvantageous due to the fact that natural juvabione occurs only in small quantities in balsam fir. Therefore, a great quantity of this material must be utilized in order to isolate a small amount of natural (+) juvabione. Additionally, the process whereby juvabione is isolated from the balsam fir has proven extremely cumbersome and uneconomical. Up until the present time, there has been no procedure for directly chemically synthesizing natural (+) juvabione without isolating it from its natural source.

SUMMARY OF THE INVENTION

This invention is directed to synthesizing juvabione or juvabione derivatives of the formula:

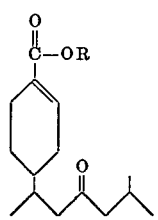

I-A wherein R is a lower alkyl, from a keto aldehyde of the formula:

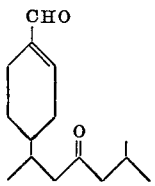

II by first treating said keto aldehyde with an oxidizing agent to convert said keto aldehyde to a keto acid of the formula:

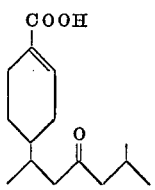

III and thereafter treating said keto acid with an esterifying agent such as a lower alkanol, a diazoalkane or an alkylhalide in the presence of a base to form the compounds of Formula I-A By means of this process, all desired stereoisomers and racemates thereof of Formula I-A can be produced depending upon the stereoisomer of Formula II that is utilized as the starting material in this process. This can be done since the reactions which convert compounds of Formulu II above to compounds of Formula I above do not affect the configuration of compounds of the Formula II above.

The process of this invention produces the known juvabione compound of Formula I. Furthermore, the process of this invention can produce all of the other isomers of natural juvabione which consist of compounds of the formula:

(4S, 1'R)

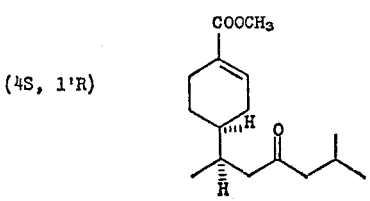

(4R, 1'R)

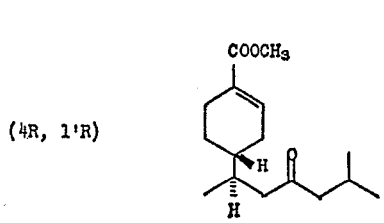

(4S, 1'S)

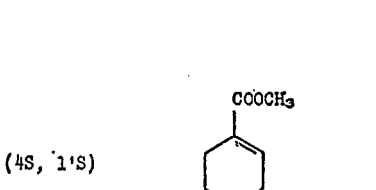

All of these compounds upset the hormone balance of insects such as those of the Hempiteran order which include *Pyrrocoris apterus* (Linden bug) and *Leptocoris trivittatus* to prevent them from growing, maturing and reproducing. In addition, the process for this invention produces new and novel compounds of the formula:

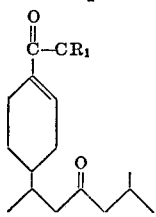

I-B wherein $R_1$ is alkyl containing from 2 to 6 carbon atoms.

The new and novel compounds of Formula I-B above exhibit insecticidal properties in the same manner as the aforementioned juvabione compounds of Formula I and related isomers by upsetting the hormone balance of insects such as those of the Hempiteran order to prevent them from growing, maturing and reproducing. These compounds are utilized as an insecticide by applying them to the larvae of insects by spraying, dusting, etc.

DETAILED DESCRIPTION OF THE INVENTION

The numbering of the cyclohexene ring and the alkyl chain is shown in Formula I for the purpose of convenience.

In the structural formulate given throughout this application, the substituents which are attached to the molecule above the plane of the molecule are designated by $\Delta$, and the substituents which are attached to the molecule below the plane of the molecule are designated by $|||$.

As used throughout the application, the term "lower alkyl" comprehends both straight and branched chain saturated hydrocarbon groups containing from 1 to 6 carbon atoms such as methyl, ethyl, propyl, isopropyl, etc. The term "lower alkylene" includes both straight and branched chain alkylene radicals containing from 2 to 6 carbon atoms, such as ethylene, propylene, butylene, isobutylene, etc. The term "lower alkanoyl" includes alkanoyl groups containing from 1 to 6 carbon atoms such as acetyl, propionyl, formyl, butyryl, etc. The term "lower alkoxy" includes alkoxy groups containing from 1 to 6 carbon atoms such as methoxy, propoxy, ethoxy, etc.

The oxidation of the keto aldehyde of Formula II above to the keto acid of Formula III above is carried out by treating the compound of Formula II above with an oxidizing agent, preferably silver oxide. Any conventional oxidizing agent can be utilized in this reaction. Generally, this reaction can be carried out in the presence of an inert organic solvent. Any conventional inert organic solvent can be utilized in carrying out this reaction. Typical inert organic solvents which can be utilized in carrying out this reaction include benzene, heptane, etc. The use of the inert solvent will depend to a large extent on the oxidizing agent utilized. This oxidation reaction can, if desired, be carried out in the presence of an inorganic acid or alkali depending upon the choice of the oxidizing agent. In carrying out the oxidation reaction, temperature and pressure are not critical and this reaction can be carried out at room temperature and atmospheric pressure. Generally, it is preferred to utilize a temperature of from 0° C. to about 50° C.

The compound of Formula III above can be converted into the compound of Formula I-A above by treating the compound of Formula III above with an esterifying agent. Any conventional method of esterifying the compound of Formula III above can be utilized in this process. Typical esterifying agents which can be utilized include diazo lower alkanes such as diazomethane, diazoethane; lower alkanols such as methanol, ethanol, isopropanol; or lower alkyl halides such as methyl iodide, ethyl bromide, in the presence of an organic or inorganic base. Any conventional inorganic or organic base can be utilized in conjunction with the aforementioned esterifying agents. Among the inorganic bases which can be utilized in accordance with this invention are sodium hydroxide, potassium carbonate, pyridine, sodium methoxide, etc. Generally, it is preferred to carry out this esterification reaction in the presence of an inert organic solvent. Any conventional inert organic solvent can be utilized in carrying out this reaction. Among the preferred inert organic solvents which can be utilized are included diethyl ether, petroleum ether, methyl ethyl ether, etc. In carrying out this reaction, temperature and pressure are not critical. Therefore, this reaction can be carried out at room temperature and atmospheric pressure or at elevated temperatures and pressures. Generally, it is preferred to carry out this reaction at temperatures of from 0° C. to the boiling point of the solvent.

In accordance with one embodiment of this invention, the compounds of Formula I-B above can be prepared from the compound of Formula I above by reacting the compound of Formula I have with an excess amount of an alkanol containing from 2 to 6 carbon atoms. In carrying out this reaction at least 1 mole of the alkanol per mole of the compound of Formula I should be present in the reaction media. However, larger excesses, i.e., about 500 moles of the alkanol per mole of compound of Formula I can be present. Generally, this reaction is not carried out in a solvent since the excess alkanol acts as the solvent. Furthermore, it is generally preferred to carry out this reaction in the presence of an inorganic or organic acid catalyst. Any conventional inorganic or organic acid catalysts such as p-toluene sulfonic acid, sulfuric acid, etc., can be utilized. Generally, this reaction is carried out at temperatures of from 50° C. to 150° C., depending upon the reflux temperature of the alkanol.

In accordance with one embodiment of this invention, keto aldehyde of Formula II above can be prepared from an aldehyde of the formula:

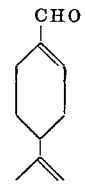

by means of the following reaction scheme:

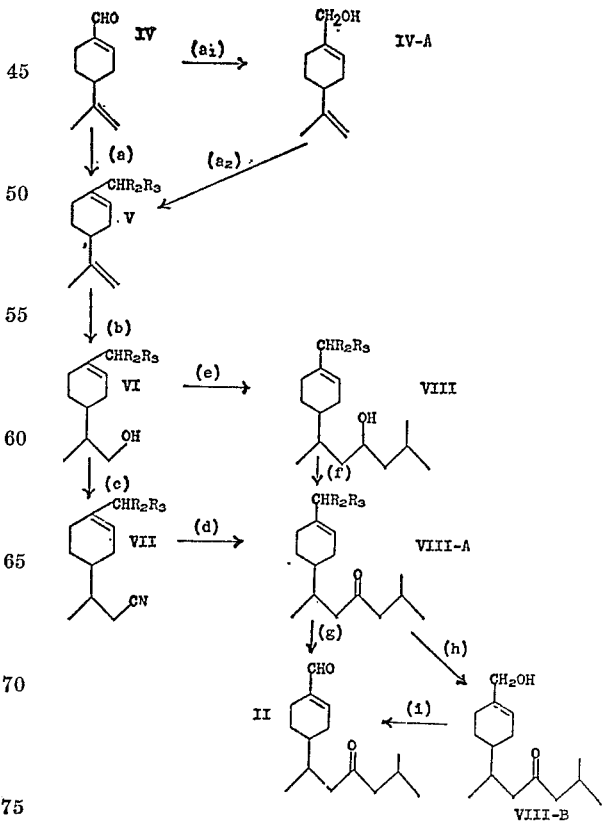

wherein $R_2$ is hydrogen or —$OR_5$; $R_3$ is —$OR_4$ and —$OR_5$; and taken together with $R_2$ form lower alkenedioxy; $R_4$ is lower alkanoyl; and $R_5$ is lower alkyl with the proviso that when one of $R_2$ or $R_3$ is —$OR_5$, the other is also —$OR_5$.

The compound of Formula IV above is converted into the compound of Formula V above, wherein $R_2$ and $R_3$ taken together form lower alkenedioxy by reacting the compound of Formula IV above with a lower alkylene glycol. Generally, this reaction is carried out in an inert organic solvent in the presence of an acid catalyst. Any conventional acid catalyst such as p-toluene sulfonic acid, etc. can be utilized. Any conventional inert solvents such as the solvents hereinbefore mentioned can be utilized in this reaction. This reaction is carried out so that the water formed during the reaction is continuously removed. Therefore, temperatures sufficient to remove the water formed during the reaction, which can be in the form of an azeotropic mixture with the solvent, are generally utilized. Among thee lower alkylene glycols which can be utilized in forming the compound of Formula V are included ethylene glycol, 2,3-butanediol, 2,2-dimethyl-1,3-propanediol, etc.

The compound of Formula IV above is converted to the acetal of Formula V above, i.e., wherein $R_2$ and $R_3$ are both —$OR_5$ by treating the compound of Formula IV with a lower alkanol and an alkylating agent. Any conventional method for converting an aldehyde to an acetal can be utilized to convert the compound of Formula IV above to the compound of Formula V above wherein $R_2$ and $R_3$ are both —$OR_5$. A typical method of converting the compound of the Formula IV to an acetal of the Formula V above is by treating the compound of the Formula IV above with an alkylating agent and a lower alkanol. Conventional alkylating agents such as triethyl or trimethyl orthoformate can be utilized. Generally, an acid catalyst is utilized in carrying out this reaction. Any conventional acid catalyst can be utilized. The acid catalysts include mineral acids such as sulfuric acid, Lewis acids, such as stannic chloride, ferric chloride, etc., and organic acids, such as acetic acid. In carrying out this reaction, the lower alkanol, such as methanol or ethanol is utilized as the reaction medium. Furthermore, in carrying out this reaction, temperature and pressure are not critical and the reaction can be carried out at room temperature and atmospheric pressure and at elevated or reduced temperatures.

The conversion of compounds of the Formula IV above to compounds of the Formula IV–A above, is carried out by treating the compound of Formula IV above with an alkali metal aluminum hydride or alkali metal borohydride. In carrying out this reaction, any conventional alkali metal aluminum hydride or alkali metal borohydride such as lithium aluminum hydride, sodium aluminum hydride, etc., sodium borohydride, potassium borohydride, can be utilized as the reducing agent. In carrying out this reaction, temperature and pressure are not critical, and this reaction can be carried out at room temperature and atmospheric pressure or at elevated or reduced temperatures and pressures. Generally, it is preferred to carry out this reaction at a temperature of from minus 20° C. to plus 60° C. This reduction reaction is generally carried out in the presence of an inert organic solvent. Any conventional inert organic solvent can be utilized to carry out this reaction, such as the solvents hereinbefore mentioned. Among the preferred solvents are the ethers such as tetrahydrofuran, diethyl ether, dioxane and the like.

The conversion of compounds of the Formula IV–A to compounds of the Formula V, wherein $R_3$ is lower alkanoyl is carried out as in step ($a_2$) by means of treating the compound of the Formula IV–A with an acid esterifying agent. Any conventional organic acid esterifying agent can be utilized in the reaction of step ($a_2$). Among the conventional esterifying agents for use in this reaction are included anhydrides of lower alkanoic acids, lower alkanoic acids and lower alkanoic acid chlorides. Generally, it is preferred to carry ont the esterification reaction of step ($a_2$) in an inert organic solvent medium in the presence of an inorganic or organic base as a catalyst. Any conventional basic catalyst can be utilized such as pyridine, triethylamine, potassium hydroxide, etc. Furthermore, any conventional inert organic solvent such as those hereinbefore mentioned can be utilized. In carrying out this reaction, temperature and pressure are not critical and this reaction can be effected at room temperature and atmospheric pressure or at elevated temperatures and pressures. Generally, it is preferred to carry out this reaction at a temperature of from about 0° C. to 50° C.

The conversion of compounds of the Formula V into compounds of the Formula VI, is carried out as in step (b) by first treating the compound of the Formula V with a dialkyl or dialicyclic boron, or aluminum compound or trilower alkyl aluminum compounds followed by oxidation with nascent oxygen.

The treatment of the compound of Formula V with a dialkyl or dialicyclic borane or aluminum compound or trialkyl aluminum reduces the double bond in the 1', 2' position of the compound of Formula V and converts this compound to an organo borane or organo aluminum derivative of the compound of the Formula V. Generally, this treatment with a dialkyl or dialicyclic borane or aluminum compound or trialkyl aluminum compound is carried out in an inert atmosphere in the presence of an inert organic solvent at a temperature of from minus 70° C. to 50° C. Any conventional inert organic solvent can be utilized in this reaction such as tetrahydrofuran, diethylene glycol dimethyl ether, etc. The inert atmosphere is produced by carrying out the reaction in a blanket of an inert gas such as nitrogen, argon, etc.

The organo-borane or aluminum derivatives of the compound of the Formula V above is converted to the compound of Formula VI in the second step of reaction step (b) by oxidizing the organo-borane or aluminum derivative of the compound of Formula V with a nascent oxygen. Any conventional means of generating nascent oxygen can be utilized in carrying out this reaction. Generally, the oxidation reaction is carried out in water or in an inert organic solvent. Furthermore, it is generally preferred to carry out this oxidation reaction in the presence of an alkali metal hydroxide or alkali metal lower alkoxide. Among the preferred alkali metal hydroxides which can be utilized are included sodium hydroxide, potassium hydroxide, etc. In carrying out the second part of the reaction of step (b) temperature and pressure are not critical and this reaction can be carried out at room temperature and atmospheric pressure or at elevated temperatures and pressures. Generally, it is preferred to carry out this reaction at a temperature of from minus 10° C. to 80° C.

Among the dialkyl boron or aluminum compounds or the trialkyl aluminum compounds which can be utiliized in the first part of reaction step (b), it is generally preferred to utilize the dialkyl boron or aluminum compounds containing from 2 to 20 carbon atoms such as dimethylborane, bis - 3 - methyl-2-butyl-borane (disiamylborane), didecylborane, diisobutyl aluminum hydride, dipentyl aluminum hydride, triisobutyl aluminum, etc. If desired, a dialicyclic borane or aluminum compound wherein the alicyclic ring contains from 5 to 12 carbon atoms can be utilized. Among the dialicyclic boranes or aluminum compounds which can be utilized in accordance with this invention are included the diboranes and dialkyl aluminum prepared from alpha pinene, cyclohexene and cyclopentene.

The nascent oxygen needed to oxidize the boron or aluminum derivatives of the compound of Formula V can be produced by any conventional means such as contacting the compound of Formula V with air or a peroxy oxidizing agent. Any conventional peroxy oxidizing agent can be utilized in step (b). Among the peroxide oxidizing agents which can be utilized are hydrogen peroxide and the peroxy organic acids such as monoperphthalic, peracetic, performic, etc.

The compound of Formula VI above is converted to the compound of Formula VII above by first treating the compound of Formula VI above with a conventional leaving agent containing electrophilic groups to provide the compound of Formula VI above with an electrophilic leaving group and thereafter treating the compound of Formula VI containing said electrophilic leaving group with an alkali metal cyanide. The conversion of the hydroxy group of compounds of the Formula VI above to an electrophilic leaving group such as a halide group or equivalent electrophilic leaving group such as p-toluene sulfonyl or an alkyl or aryl sulfonyl group, e.g. methane sulfonyl, benzene sulfonyl, and the like, is carried out by any of the conventional methods of replacing a hydroxy group with an electrophilic leaving group. Preferably, the electrophilic leaving group is selected from the group consisting of halogen, benzene sulfonyl and derivatives thereof, lower alkanoyloxy, methane sulfonyl and the like. After treating the compound of Formula VI with an electrophilic leaving agent, this compound is treated with an alkali metal cyanide such as sodium cyanide in the presence of an inert organic solvent. Any conventional inert organic solvent such as the solvents hereinbefore mentioned can be utilized in this reaction. Generally, it is preferred to utilize dimethyl sulfoxide as the solvent. In carrying out the cyanide reaction, temperature and pressure are not critical and this reaction can be carried out at room temperature and atmospheric pressure or at elevated pressures and temperatures. Generally, it is preferred to utilize elevated temperatures such as from 60 to 150° C., depending upon the solvent, in order to accelerate this reaction.

The compound of Formula VII above is converted into the compound of Formula VIII–A above as in reaction step (d), by means of reacting compounds of Formula VII above with an organo metallic derivative of the formula:

IX wherein M is a material selected from the group consisting of cadmium, cadmium halogen, magnesium halogen, lithium and potassium, by means of an organo metallic reaction such as a Grignard reaction. The reaction of compounds of the Formula VII above with the organometallic derivative of a compound of the Formula IX is carried out by simply mixing this organo-metallic derivative with the compound of Formula VII above in an inert solvent. This reaction can be carried out in an inert organic solvent at temrperatures of from minus 80° C. to about 35° C. Generally, it is preferred to carry out this reaction at low temperatures. Any conventional inert organic solvent can be utilized as the reaction medium in accordance with this invention. Among the solvents suitable for this purpose are diethyl ether, tetrahydrofuran, etc. In accordance with this invention, the organo-metallic derivative of a compound of the Formula IX can either be the conventional Grignard derivatives such as the magnesium halide derivatives, or the alkali metal derivatives such as the lithium derivatives. In either case, the conventional Grignard conditions are utilized in carrying out the reaction of step (d)

Another means of forming compounds of the Formula VIII–A is by first converting the alcohol compound of Formula VI above via the corresponding halide into its organo-metallic or Grignard derivative by conventional means and thereafter reacting this organo-metallic or Grignard derivative as in reaction step (e) with an aldehyde of the formula:

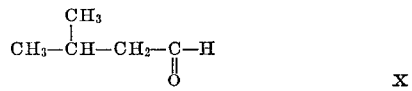

X

This reaction is carried out by conventional Grignard reaction conditions to produce a compound of the Formula VIII above. In accordance with this invention, the Grignard derivative of compounds of the Formula VII can be prepared by the conventional methods of preparing Grignard or organo-metallic reagents. The reaction of the organo-metallic derivatives of compounds of the Formula VI with the aldehyde compound of the Formula X is carried out by any of the conventional conditions utilized in Grignard or organo-metallic reactions.

The hydroxy compound of Formula VIII above can be converted to the corresponding keto compound of Formula VIII–A above by means of oxidation as in step (f). Any conventional oxidation technique can be utilized to oxidize the compound of Formula VIII above to the compound of Formula VIII–A. A method of oxidation which can be utilized includes treating the compounds of Formula VIII above with an oxidizing agent in the presence of an inert organic solvent. Any conventional oxidizing agent can be utilized in carrying out this reaction. Typical oxidizing agents, which can be utilized in this reaction, include chromic acid and sulfuric acid in water, potassium or sodium dichromate, chromium trioxide, etc. These oxidation procedures are generally carried out in the presence of an inert organic solvent, such as acetone, diethyl ether, pyridine or any of the solvents mentioned hereinbefore. In carrying out this reaction, temperature and pressure are not critical and this oxidation reaction can be effected at room temperature and at atmospheric pressure or at elevated or reduced temperatures and/or reduced or raised pressures.

When $R_2$ and $R_3$ form a lower alkylenedioxy moiety or —$OR_5$ in the compound of Formula VIII–A above, this compound can be converted to the keto aldehyde of Formula II above, as in step (g) by treatment with an acid hydrolyzing agent. Any conventional means of acid hydrolysis can be utilized to convert the compounds of Formula VIII–A above to the compounds of Formula II above. Generally, it is preferred to utilize a dilute mineral or organic acid such as sulfuric acid, formic acid or acetic acid in the presence of an inert organic solvent. Any conventional inert organic solvent can be utilized in carrying out this reaction. Generally, it is preferred to utilize a solvent which is miscible in water, such as a lower alkanol which may be methanol, ethanol, etc. or a ketone such as acetone. In carrying out this reaction, temperature and pressure are not critical and the hydrolysis reaction can be carried out at room temperature and atmospheric pressure or at elevated and reduced temperatures and pressures.

When $R_2$ and $R_3$ are respectively hydrogen and lower alkanoyloxy in compounds of the Formula VIII–A above, treatment with a hydrolyzing agent converts compounds of the Formula VIII–A, as in step (h), into the compound of the Formula VIII–B. The same conditions that are utilized in carrying out step (g) are utilized in carrying out the reaction of step (h). The compound of Formula VIII–B is converted into the compound of the Formula II, as in step (i) by means of treating a compound of the Formula VIII–B above with an oxidizing agent. The oxidation reaction of step (i) is carried out in the same manner as that described in connection with the oxidation of compounds of the Formula VIII above in step (f). However, the preferred oxidizing agent for step (i) is manganese dioxide.

In accordance with another embodiment of this invention, when $R_2$ and $R_3$ form a lower alkylenedioxy moiety or —$OR_5$ in the compound of Formula VIII above, this compound can be directly converted to the keto acid of Formula III above by first hydrolyzing the compound of Formula VIII above by utilizing the conditions of reaction step (g). Hydrolysis of the compound of the Formula VIII by the above means, converts this compound to a hydroxy aldehyde compound of the formula:

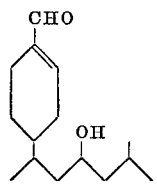
VIII-C

The compound of the Formula VIII-C above can be directly converted to the keto acid of the Formula III above by oxidation with a chromate oxidizing agent. Any conventional chromate oxidizing agent such as chromium trioxide, sodium or potassium dichromate, chromic acid, etc., can be utilized in this oxidation reaction. Generally, this reaction is carried out in a solvent medium. Any conventional inert organic or inorganic solvent such as water, acetone, hexane, etc., can be utilized. If desired, a mineral or organic acid can be present in the reaction medium. These acids include sulfuric, hydrochloric, acetic, etc. The oxidation reaction can be carried out at room temperature, if desired. However, higher or lower temperatures can be utilized. Generally, it is preferred to utilize a temperature of from minus 10° C. to 100° C.

The keto aldehyde compound of Formula II above can be present in all the 4R1'S, 4R1'R, 4S1'S and 4S1'R stereoisomeric forms. The process of this invention can produce the keto aldehyde compound in any of the stereoisomeric forms including mixtures thereof. Furthermore, the compound of Formula II above can be converted to compounds of the Formula I-A above by means of the process hereinbefore outlined without changing the desired stereoisomeric form.

A desired stereoisomeric form of the compound of Formula II or mixtures thereof, can be obtained by utilizing as a starting material in this reaction scheme, the compound of Formula IV above in either its 4R or 4S forms, or in the form of a mixture thereof. When a specific stereoisomer of Formula IV above is utilized as a starting material, the reaction of step (b) introduces an additional asymmetric carbon atom in the molecule at the 1'-position of the aliphatic chain. The resulting mixture of diastereoisomers, if desired, can be separated by any conventional chemical or physical means such as crystallization. Alternatively, the resulting mixture of diastereoisomers can be carried through the entire reaction sequence or can be separated at any later step in the process of this invention by any conventional chemical or physical methods, e.g., crystallization. In accordance with the process of this invention, the compound of Formula VI above can be carried through the entire reaction sequence to produce the compound of Formula I-A without any change in its stereochemistry. In this manner, the compound of Formula I-A can be produced in any desired stereoisomeric configuration by the process of this invention.

The compound of Formula IV above, which is utilized as a starting material, is readily available in its 4S enantiomer form or in the form of a racemic mixture. In accordance with this invention, one can produce the 4R enantiomer of compounds of Formula IV above and convert it to compounds of the Formula I-A with the 4R configuration such as the natural juvabione by the process of this invention without the necessity of isolating the compound from its natural source. Therefore, the compound of Formula II can be prepared by the process of this invention in any of its stereoisomeric forms or as a mixture.

Hence, the compound of Formula II can be prepared so that this compound can exist in any of the following forms or as mixtures thereof:

4R(1S,5-dimethyl-3-oxohex-1-yl)-1-cyclohexene-1-carboxaldehyde
4S(1R,5-dimethyl-3-oxohex-1-yl)-1-cyclohexene-1-carboxaldehyde
4R(1R,5-dimethyl-3-oxohex-1-yl)-1-cyclohevene-1-carboxaldehyde
4S(1S,5-dimethyl-3-oxohex-1-yl)-1-cyclohexene-1-carboxaldehyde Furthermore, the process of this invention can produce the compound of Formula VIII-C in any of the stereoisomeric forms. Hence, the compound of Formula VIII-C can be prepared so that this compound can exist in any of the following forms or as mixtures thereof such as:

4R(3-hydroxy-1R-5-dimethylhexyl)-1-cyclohexene-1-carboxaldehyde
4R(3-hydroxy-1S,5-dimethylhexyl)-1-cyclohexene-1-carboxaldehyde
4S(3-hydroxy-1R,5-dimethylhexyl)-1-cyclohexene-1-carboxaldehyde
4S(3-hydroxy-1S,5-dimethylhexyl)-1-cyclohexene-1-carboxaldehyde The compound of Formula IV in its 4R stereoisomeric form can be produced from the 4R stereoisomeric form of the compound of the formula:

XII by the following reaction scheme:

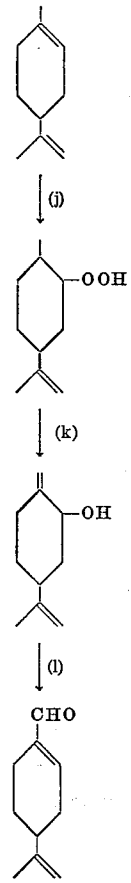

The conversion of the compound of the Formula XII above to the compound of the Formula XIII above, is carried out, as in step (j), by oxidation with singlet oxygen. Generation of the singlet oxygen can be achieved by either physical or chemical means, for example, by passing oxygen through an electric discharge tube, by irradiation in oxygen in the presence of a sensitizer or by the decomposition of peroxide, etc.

The term "singlet oxygen" is intended to denote oxidation with an active oxygen obtained as indicated above, or as described, for example by, Russian Chemical Reveiws, vol. 34, No. 8, pp. 558–574 (August 1965), particularly pp. 570–571; Journal of the Chemical Society (B) 1966, pp. 1040–1046; and the Journal of the Chemical Society, vol. 86, pp. 3879–3881, (1964), particularly 3880–3881.

The conversion with irradiated oxygen can be conveniently carried out, for example, by bubbling a stream of oxygen or oxygen containing gas, e.g., air, into a solution of the compound of Formula XII above, in an inert organic solvent. As sensitizer there can be employed any of the usual photosensitizing agents such as the sensitizing dyes, e.g., the eosins, methylene blue, Rose bengal, erythrosin, chlorophyll and the like. As the activating light, there can be employed visible light, or light of shorter wave lengths. It is preferred, however, to utilize light having a wave length between 3,000 angstroms and about 8,000 angstroms. Single oxygen can be generated chemically by reactions which are per se known, for example, by the decomposition of peroxides. Thus, for example, the oxidation of the comopund of Formula XII can be carried out by treating the compound of Formula XII in an inert organic solvent with a mixture of sodium hypochloride and hydrogen peroxide in methanol, or with bromine and alkaline hytrogen peroxide in a two-phase system, i.e., a solvent system composed of an aqueous solvent and a water-immiscible organic solvent, or with alkaline solutions of organid peracides, e.g., perbenzoic acid. The reaction with singlet oxygen whether physically or chemically generated is conveniently accomplished in the presence of an organic solvent preferably an alcohol, particularly the lower alkanols, e.g., methanol, ethanol, propanol, isopropanol, butanol, etc. The reaction is preferably carried out at room temperature or below. A suitable temperature for the reaction is between about 65° C. to about 30° C.

The conversion of the compound of the Formula XIII to the compound of the Formula XIV is carried out, as in reaction step (k), by treating the compound of the Formula XIII above with an inorganic reducing agent. Any conventional inorganic or organic reducing agent such as sodium sulfite, lithium aluminum hydride, sodium borohydride, triethyl phosphite, etc. can be utilized in this reaction. Furthermore, the reaction of step (k) can be carried out in a conventional inert organic solvent. Any of the conventional organic solvents hereinbefore employed can be utilized in carrying out this reaction. In carrying out this reaction, temperature and pressure are not critical and this reaction can be carried out at room temperature or elevated or lower temperatures. A suitable temperature for the reaction is between about 0° C. to about 60° C.

The conversion of compounds of the Formula XIV above, to a compound of the Formula IV above, as in step (l), is carried out by oxidizing the compound of the Formula XIV above with a chromate oxidizing agent. In carrying out the reaction of step (l), the same conditions are utilized as that described in connection with oxidizing a compound of the Formula VIII–C to a compound of the Formula III.

When the 4R enantiomer of the compound of the Formula XII above is utilized as the starting material, this stereoisomer is carried through the entire reaction sequence. While this process of converting compounds of the Formula XII to the compound of the Formula IV above, is described with respect to utilizing the 4R stereoisomer of the compound of the Formula XII above, it is apparent that the other stereoisomers of the compound of the Formula XII, such as the 4S isomer and racemic mixtures, can be utilized to respectively produce the compound of Formula XIV in the form of its 4S stereoisomer or as a racemic mixture.

In accordance with another embodiment of this invention, the compound of Formula XII above, in the form of any of its stereoisomers or in the form of a racemic mixture can be converted to the compound of the Formula II above by means of the following reaction scheme:

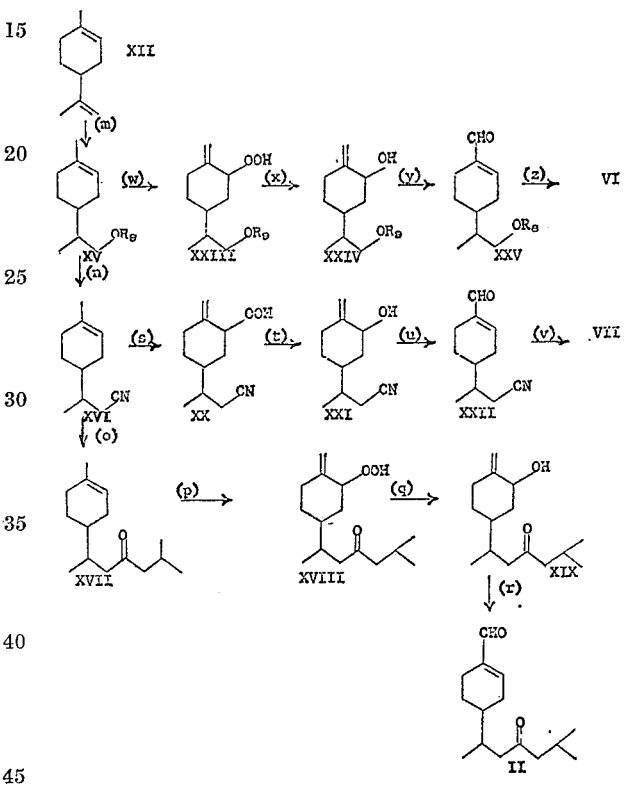

wherein $R_8$ is lower alkanoyl, and $R_9$ is hydrogen or lower alkanoyl.

The compound of the Formula XII above is converted into the compound of the Formula XV above, as in reaction step (m) by first treating the compound of the Formula XII above with an organic boron or aluminum compound followed by oxidation with nascent oxygen in the manner of step (b). The same conditions that are utilized in carrying out the conversion of compounds of the Formula V above, to compounds of the Formula VI as recited hereinbefore in connection with step (b), are utilized in carrying out the reaction of step (m). The conversion of the compound of the Formula XV above, to the compound of the Formula XVI above, is carried out in reaction step (n) by means of first treating the compound of the Formula XV above with a leaving agent and thereafter treating this compound containing this leaving group with an alkali metal cyanide salt. The reaction of step (n) is carried out in the same manner as described hereinbefore in connection with reaction step (c). The conversion of the compound of the Formula XVI above to the compound of the Formula XVII above, as in step (o), can be carried out by the organo-metallic reaction described in connection with step (d). The same conditions utilized in connection with reaction step (d) can be utilized in carrying out the reaction of step (o).

The compound of Formula XVII above can be converted to the compound of Formula XVIII above via reaction step (p) by treating the compound of Formula XVII above with singlet oxygen in the same manner described in connection with reaction step (j). The compound of Formula XVIII above thus formed, can be converted into the compound of Formula XIX above, as in reaction step (q) by treating the compound of Formula XVIII above with a reducing agent in the same manner recited in connection with step (k). The compound of the Formula XIX above can be converted into the compound of the Formula II above as in reaction step (r), by treating the compound of the Formula XIX above with an oxidizing agent in the same manner described in connection with step (l).

In accordance with another embodiment of this invention, the compound of the Formula XVI above can be converted into the compound of the Formula XXII above by the series of reaction steps (s), (t), and (u), to produce compounds of the Formulae XX and XXI, respectively as intermediates. The reaction sequence (s), (t) and (u) to convert compounds of the Formula XVI above to the compound of the Formula XXII above, is carried out in the same manner as the reaction sequence (p), (q) and (r), which is utilized to convert the compound of the Formula XVII above to the compounds of the Formula II above. The compound of the Formula XXII is thereafter converted into a compound of the Formula VII via reaction step (v) by means of treating the compound of the Formula XXII above with a lower alkylene glycol in the manner described in step (a) or by reduction followed by esterification in the manner described in connection with step (a1) and (a2). Alternatively, the compound of Formula XXII can be converted to the compound of Formula VII via reaction step (v) by treating the compound of Formula XXII with a lower alkanol and an alkylating agent as described in connection with step (a). Compounds of the Formula VII are converted into a compound of the Formula II above in the manner hereinbefore described.

According to another embodiment of this invention, the compound of the Formula XV above is converted into the compounds of the Formula VI by means of the reaction sequence (w), (x), (y) and (z), producing compounds of the Formulae XXIII, XXIV and XXV, respectively as intermediates. The reaction sequence (w), (x), (y) and (z) is carried out in the same manner as the reaction sequence (s), (t), (u) and (v) except that the compound of Formula XV may be first esterified prior to step (w) to form an ester of a lower alkanoic acid, by conventional means hereinbefore described, prior to carrying out this reaction sequence. Alternatively, the compound of Formula XV need not be esterified prior to carrying out reaction steps (w) and (x). However, esterification should take place after carrying out reaction step (x). Therefore, the compound of Formula XXIV should be esterified prior to carrying out reaction step (y). Furthermore, the compound of the Formula XXV above is hydrolyzed prior to or after carrying out reaction step (z). Compounds of the Formula VI above are converted into compounds of the Formula II above in the manner hereinbefore described.

In accordance with another embodiment of this invention, the compounds of any one of the Formulae XIV, XXI, XXIV and XIX can be converted into a compound of the formula:

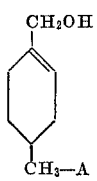
XXVI wherein A is

and

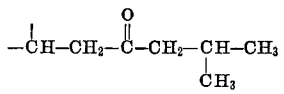

and $R_8$ is a lower alkanoyl by the following reaction scheme:

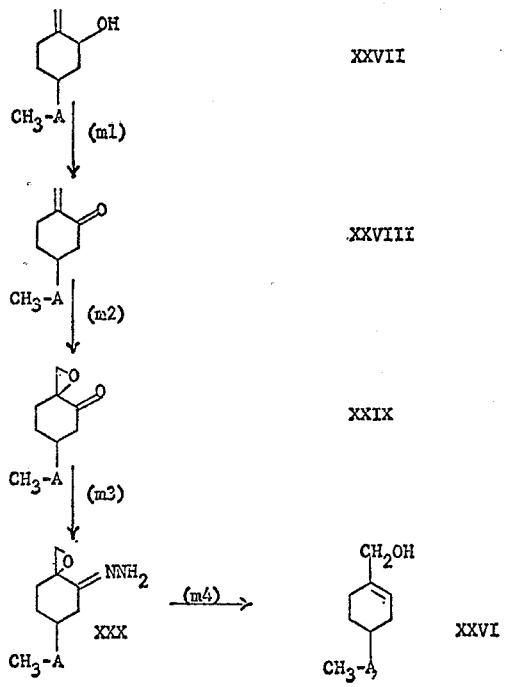

wherein A is as above.

The conversion of compounds of the Formula XXVII to compounds of the Formula XXVIII, as in step (m1), is carried out by treating the compounds of the Formula XXVII above with manganese dioxide. The same oxidizing conditions that were described in connection with step (i) can be utilized in carrying out the reaction of step (m1) except that manganese dioxide is utilized as the oxidizing agent. The conversion of compounds of the Formula XXVIII above to compounds of the Formula XXIX is carried out by treating the compound of the Formula XXVIII with a peroxy compound as in step (m2). Any of the peroxy compounds utilized in connection with carrying out the reaction of step (b) can be utilized in carrying out the reaction of step (m2). Furthermore, the conditions utilized in carrying out the peroxy oxidizing reaction of step (b) can be utilized in carrying out the reaction in step (m2).

The conversion of compounds of the Formula XXIX above to compounds of the Formula XXX above, as in reaction step (m3), is carried out by treating the compound of the Formula XXIX with a hydrazine. Any conventional hydrazine compounds such as the lower alkyl hydrazines or any hydrazines containing from 6 to 16 carbon atoms or hydrazine can be utilized in carrying out the reaction of step (m3). The reaction of step (m3) is carried out in the preesnce of an inert organic solvent such as methanol, benzene, etc. Any of the conventional inert organic solvents hereinbefore mentioned can be utilized in carrying out the reaction of step (m3). In carrying out the reaction of step (m3), temperature and pressure are not critical and this reaction can be carried out at room temperature and atmospheric pressure or at elevated temperatures and pressures. Generally, it is preferred to carry out this reaction at temperatures of from minus 10° C. to 100° C.

The conversion of compounds of the Formula XXX to compounds of the Formula XXVI as in step (m4) is carried out by heating the compound of the Formula XXX to a temperature of from 60° C. to 120° C. with a base. Generally, this reaction can, if desired, be carried out in the presence of an alkali metal alkoxide or alkali metal hydroxide. Any conventional alkali metal alkoxide or alkali metal hydroxide such as potassium hydroxide, potassium tertiary butoxide, sodium hydroxide, sodium methoxide, etc., can be utilized in carrying out the reaction of step (m4). Furthermore, the reaction of step (m4) can be carried out in the presence of any conventional inert solvent such as the solvents hereinbefore mentioned. Generally, it is preferred to utilize dimethyl sulfoxide as the solvent. In carrying out this reaction, temperature and pressure are not critical and this reaction can be carried out at room temperature or at elevated temperatures and pressures. In the case where dimethyl sulfoxide is utilized as the solvent, it is generally preferred to utilize low temperatures, i.e., 0° C. to 80° C. in carrying out this reaction.

When A in the compound of Formula XXVI above is

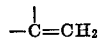

the compound is the compound of the Formula IV–A. When A in the compound of Formula XXVI is

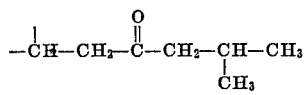

the compound is the compound of Formula VIII–B. On the other hand, when A in the compound of Formula XXVI is

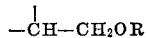

this compound can be hydrolyzed in the manner of step (z) and thereafter reacted with an esterifying agent in the manner of step (a2) to form the compoud of Formula VI above. If A in the compound of Formula XXVI is —CH—CH$_2$—C≡N, the compound can be reacted with an esterifying agent in the manner of step (a2) to produce a compound of the Formula VII above. Alternatively, the compound of Formula XXVI wherein A is

—CH—CH$_2$—C≡N can be oxidized in the manner of step (i), to the corresponding aldehyde. This aldehyde can be converted by treatment with a lower alkylene glycol or a lower alkanol and an alkylating agent in the manner set forth in step (a) to produce a compound of the Formula VII above.

In accordance with another embodiment of this invention, the compounds of any one of the Formulae XII, XV, XVI and XVII can be converted into a compound of the formula:

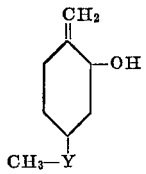

wherein Y is selected from the group consisting of

$$-\overset{|}{C}H-CH_2-\overset{O}{\overset{\|}{C}}-CH_2-\overset{|}{C}H-CH_3$$
$$\overset{|}{C}H_3$$

and R$_8$ is a lower alkanoyl, by the following reaction scheme:

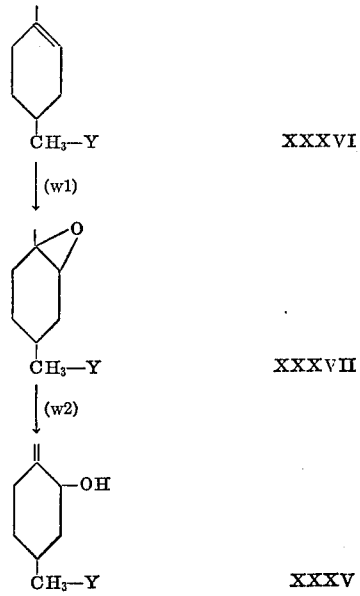

wherein Y is as above.

The compounds of Formula XXXVI above are converted to the compound of Formula XXXVII by treating the compounds of Formula XXXVI above with an organic peracid. Any conventional organic peracid can be utilized in carrying out this reaction. Among the conventional organic peracids which can be utilized, meta chloro perbenzoic acid, and mono-perphthalic acid are preferred. In carrying out this reaction, any conventional inert organic solvent can be utilized. Among the preferred inert organic solvents, the halogenated hydrocarbons such as methylene chloride are preferred. In carrying out this reaction, temperature and pressure are not critical, and the reaction can be carried out at room temperature and atmospheric pressure. If desired, any temperature of from 10° C. to 100° C. can be utilized in carrying out this reaction.

The reaction of step (w2) is carried out by treating the compound of Formula XXXVII with an alkali metal salt of a dilower alkyl amine. Any conventional alkali metal salt of a dilower alkyl amine such as the sodium, potassium or lithium salts of diethyl amine can be used in carrying out this reaction. This reaction can be carried out in a conventional inert organic solvent. Any conventional inert organic solvents such as tetrahydrofuran, diethyl ether, benzene, etc., can be utilized in carrying out this reaction. In carrying out this reaction, temperature and pressure are not critical, and this reaction can be carried out at room temperature and atmospheric pressure. Generally, temperatures of from —10° C. to 100° C. can be utilized in carrying out this reaction. This reaction is preferably carried out at the reflux temperature of the reaction medium.

Where Y in the compound of the Formula XXXVI above is

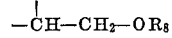

this compound is prepared by first esterifying the compound of Formula XV with a lower alkanoic acid by any conventional procedure such as that procedure mentioned hereinbefore. The esterified compound of Formula XV above is then converted to the compound of Formula XXXV above via reaction steps (w1) and (w2).

The following examples are illustrative of this invention. All temperatures are in degrees centigrade and all products having center of asymmetry are racemic unless

EXAMPLE 1

Preparation of 2-[4(S)-isopropenyl-1-cyclohexen-1-yl]-1,3-dioxolane 15.0 g. of 4(S)-isopropenyl-1-cyclohexene-1-carboxaldehyde, 12.4 g. of ethylene glycol, 100 mg. of p-toluenesulfonic acid monohydrate and 12 mg. of hydroquinone in 300 ml. of benzene were heated to the reflux. After the required amount of water had been removed by azeotropic distillation, the reaction mixture was allowed to cool and poured into 1 liter of an aqueous solution containing 5% by weight of sodium carbonate. The organic phase was separated and the aqueous layer was extracted with three 100-ml. portions of diethyl ether. The combined organic layers were washed twice with water, dried with anhydrous sodium sulfate and concentrated on the rotary evaporator to yield 2-[4(S)-isopropenyl-1-cyclohexen-1-yl]-1,3-dioxolane as product.

This crude product was purified by shaking overnight with 4.6 g. of sodium sulfite and 3.3 g. of sodium bicarbonate in 10 ml. of water containing 10 g. of ice. The organic material was extracted with diethyl ether, dried with anhydrous sodium sulfate, and concentrated. This product distilled at 84–89° C. (0.05 mm.).

EXAMPLE 2

Preparation of 2-[4-(R,S)-isopropenyl-1-cyclohexen-1-yl]-4,5-dimethyl-1,3-dioxolane 4-(R,S)-isopropenyl - 1 - cyclohexene-1-carboxaldehyde was converted to 2-[4-(R,S)isopropenyl-1-cyclohexene-1-yl]4,5-dimethyl-1,3-dioxolane by reacting 20.0 g. of 4-(R,S - isopropenyl-1-cyclohexene-1-carboxaldehyde with 24.0 g. of 2,3-butanediol, 50 mg. of p-toluene-sulfonic acid monohydrate, 25 ml. of hydroquinone and 320 ml. of benzene in the manner recited in Example 1.

EXAMPLE 3

Preparation of 2-[4(R,S)-(2-hydroxy-1-methyl-1R,S-ethyl)-1-cyclohexen-1-yl]-4,5-dimethyl-1,3-dioxolene Disiamylborane (55 ml. of a 1 M solution in tetrahydrofuran) was placed in a 250 ml. round-bottomed flask fitted with a condenser, thermometer, dropping funnel and stirrer (which had been previously dried in an oven and cooled to 0° in an atomsphere of nitrogen). 11.1 g. of 2-[4-(R,S)-isopropenyl-1-cyclohexen-1-yl]-4,5-dimethyl-1,3-dioxolane was added slowly over a 20-minute period at 0 to plus 1° C. The mixture was stirred at 0° C. for 20 minutes and then allowed to come to room temperature for 5 hours. Water (4 ml.) was added to decompose any excess dialkylborane. The reaction mixture was then oxidized with 20 ml. of 3 N sodium hydroxide and then 20 ml. of an aqueous solution containing 30% by weight of hydrogen peroxide at 30–50° C. Extraction with diethyl ether produced crude 2-[4-(R,S) - (2 - hydroxy-1-methyl-1R,S-ethyl)-1-cyclohexen-1-yl]-4,5-dimethyl-1,3-dioxolane. This crude product was purified by column chromatography on activity III Woelm alumina. Elution with 95:5 by volume of benzene:ether produced pure 2 - [4(R,S)-(2-hydroxy-1-methyl-1R,S-ethyl)-1-cyclohexen-1-yl]-4,5-dimethyl-1,3-dioxolane.

EXAMPLE 4

Preparation of 2-[4(S)-(2-hydroxy-1-methyl-1-ethyl)-1-cyclohexen-1-yl]-1,3-dioxolane Diisopinocampheylborane is prepared as described in Brown et al.[1] from 6.8 g. (+)-α-pinene in 12.5 ml. of diethylene glycol dimethyl ether, 18.75 ml. of a 1 M solution of sodium borohydride in diethylene glycol di-

[1] J. Am. Chem. Soc., 86, 393, 397, 1076 (1964).

methyl ether and 3.15 ml. of boron trifluoride etherate in 7.5 ml. of diethylene glycol dimethyl ether. 4.85 g. of 2-[4(S)-isopropenyl - 1 - cyclohexen-1-yl]-1,3-dioxolane was added slowly at 0° C. to the diisopinocampheylborane prepared above and the reaction mixture was kept at that temperature for 5 hours. The reaction mixture was oxidized with 10 ml. of 3 N sodium hydroxide aqueous solution and 8 ml. of an aqueous solution containing 30% by weight of hydrogen peroxide at 30–50° C. Chromatography of the crude product on activity III Woelm alumina and elution with 9:1 by volume benzene:ether mixture produced 2-[4(S)-(2 - hydroxy-1-methyl-1-ethyl)-1-cyclohexen-1-yl]-1,3-dioxolane.

EXAMPLE 5

Preparation of (±)-3-[4-(4,5-dimethyl-1,3-dioxolan-2-yl)-3-cyclohexen-1-yl]butyronitrile 4.3 g. of 2-[4(R,S)-(2-hydroxy-1-methyl-1R,S-ethyl)-1-cyclohexen-1-yl]-4,5-dimethyl - 1,3 - dioxolane and 6.8 g. of p-toluene-sulfonyl chloride in 150 ml. of dry pyridine were stirred at room temperature for 4 days. The reaction mixture was poured into water containing cracked ice and the organic material was extracted with benzene. The benzene solution was washed with water, concentrated, and evaporated at 0.1 mm., to give the tosylate.

This tosylate was dissolved in 150 ml. of anhydrous dimethylsulfoxide. Sodium cyanide (1.02 g.) was added to the solution and the mixture was stirred at room temperature for three days. The reaction mixture was poured into water containing ammonium chloride and extracted with methylene chloride. The methylene chloride layer was washed five times with water, dried and concentrated on the rotary evaporator to give (±)-3-[4-(4,5-dimethyl-1,3-dioxolan-2-yl)-3-cyclohexen-1-yl]butyronitrile as the crude product. Chromatography on activity III Woelm alumina and elution with 1:1 by volume hexane:benzene mixture produce pure (±)-3-[4-(4,5-dimethyl-1,3-dioxolan-2-yl)-3-cyclohexen-1-yl]butyronitrile.

EXAMPLE 6

Preparation of 4-(1,5-dimethyl-3-oxohex-1-yl)-1-cyclohexene-1-carboxaldehyde 5.63 g. of (±)-3-[4-(4,5-dimethyl-1,3-dioxolan-2-yl)-3-cyclohexen-1-yl]butyronitrile was dissolved in 120 ml. of anhydrous diethyl ether in a 500-ml. flask fitted with a condenser, thermometer, dropping funnel and stirrer, which had been carefully dried and allowed to cool under nitrogen. The ether solution was cooled to −50° C. in a Dry Ice-acetone bath and 17 ml. of a 2 N solution of isobutyl lithium in heptane was added. The reaction mixture was stirred at −50° C. for 3.5 hours and then allowed to come to 0°. A solution of 16.8 ml. of 6 N sulfuric acid in 105 ml. of acetone was added at 0° C. The mixture was stirred for an additional 2 hours. The organic layer was separated; the aqueous phase was made basic and extracted three times with ether. The combined organic layers were washed with a saturated aqueous sodium chloride solution, dried with anhydrous sodium sulfate, and concentrated to give 4-(1,5-dimethyl-3-oxo-hex-1-yl)-1-cyclohexene-1-carboxaldehyde.

EXAMPLE 7

Preparation of (±)-todomatuic acid 2.13 g. of 4-(1,5-dimethyl-3-oxohex-1-yl)-1-cyclohexene-1-carboxaldehyde were dissolved in 30 ml. of ethanol in a 250 ml. flask and a solution of 4.25 g. of silver nitrate in 8 ml. of water was added. An aqueous solution containing 4.25 g. of sodium hydroxide in 70 ml. of water was added dropwise to the stirred reaction mixture. Stirring was continued for 3 hours at room temperature. The mixture was filtered through Celite and the filtrate was concentrated on the rotary evaporator and then made acidic with 5 N hydrochloric acid and extracted three times with diethyl ether. The ether extracts were washed with water and dried with anhydrous magnesium sulfate. Evaporation of the solvent produced (±)-todomatuic acid as a waxy crystalline solid. Fractional crystallization from pentane produced (±)-todomatuic acid as crystals.

EXAMPLE 8

Preparation of (±)-juvabione from (±)-todomatuic acid

A solution of 580 mg. of (±)-todomatuic acid in 10 ml. of anhydrous ether was treated with 12 ml. of a 10% by weight solution of diazomethane in diethyl ether. The reaction mixture was allowed to stir for one hour; one ml. of dilute aqueous acetic acid solution was added and the aqueous phase was extracted with three 20-ml. portions of ether. The combined organic layer was washed with saturated sodium bicarbonate and water and dried with anhydrous magnesium sulfate. Distillation of the crude product at 130° (0.1 mm.) produced (±)-juvabione.

EXAMPLE 9

Synthesis of 4(S)-isopropenyl-1-cyclohexene-1-methanol and 4-isopropenyl-1-cyclohexene-1-methyl acetate A solution of 5.0 g. of l-perillaldehyde in 30 ml. of anhydrous ether was added slowly to a slurry of 2.53 g. of lithium aluminum hydride in 200 ml. of anhydrous ether at 0° C. The reaction mixture was stirred at this temperature for 4 hours, and then a saturated aqueous solution of sodium sulfate was added dropwise until a granular precipitate and clear supernatant formed. This mixture was filtered. The filtrate was concentrated on the rotary evaporator to give 4(S)-isopropenyl-1-cyclohexene-1-methanol.

7.0 g. of 4(S)-isopropenyl-1-cyclohexene-1-methanol and 7.0 g. of acetic anhydride in 25 ml. of anhydrous pyridine were warmed to 50–60° for three hours, allowed to cool and poured into water containing cracked ice. The mixture was extracted with diethyl ether and the ether solution was washed three times with saturated aqueous sodium bicarbonate solution, then twice with water, and dried with anhydrous sodium sulfate. Evaporation of the solvent afforded crude 4(S)-isopropenyl-1-cyclohexene-1-methyl acetate which was purified by distillation at 68–72° C. (0.08 mm.) through a short path still.

EXAMPLE 10

Preparation of 4(S)-(2-hydroxy-1-methylethyl)-1-cyclohexene-1-methyl acetate 4.85 g. of 4(S)-isopropenyl-1-cyclohexene-1-methyl acetate was added slowly to 27.5 ml. of a 1 M solution of disiamylborane in tetrahydrofuran at 0° C. The reaction was carried out in an atmosphere of nitrogen in equipment which had been carefully dried and allowed to cool under nitrogen. The reaction mixture was allowed to stir at 0 to +5° C. for five hours. Water (2 ml.) was added and then the reaction mixture was oxidized at 30–50° C. by addition of 10 ml. of 3 N sodium hydroxide followed by 10 ml. of aqueous solution containing 30% by weight of hydrogen peroxide. Chromatography of the crude product on activity III Woelm alumina and elution with 2:1 by volume benzene-ether mixture produced 4(S)-(2-hydroxy-1-methylethyl)-1-cyclohexene-1-methyl acetate.

EXAMPLE 11

Preparation of 4(S)-(2-cyano-1-methylethyl)-1-cyclohexene-1-methyl acetate 1.0 g. of 4(S)-(2-hydroxy-1-methylethyl)-1-cyclohexene-1-methyl acetate was dissolved in 30 ml. of anhydrous pyridine. p-Toluenesulfonyl chloride (1.8 g.) was added and the reaction mixture was stirred at room temperature for three days. The reaction mixture was poured into water containing cracked ice and the organic mixture was washed with water, concentrated and dried at 0.1 mm., to give the tosylate.

This tosylate was dissolved in 25 ml. of dimethylsulfoxide and treated with 355 mg. of sodium cyanide. The reaction mixture was stirred at room temperature for two days and then poured into saturated ammonium chloride solution containing cracked ice. The organic material was extracted three times with methylene chloride; the methylene chloride extracts were washed well with water, dried with anhydrous sodium sulfate and concentrated to give 4(S)-(2-cyano-1-methylethyl) - 1 - cyclohexene-1-methyl acetate.

EXAMPLE 12

Preparation of 6-(4-hydroxymethyl-3-cyclohexen-1(S)-yl)-2-methyl-4-heptanone 372 mg. of 4(S)-(2-cyano-1-methylethyl)-1-cyclohexene-1-methyl acetate was dissolved in 10 ml. of anhydrous ether and the resulting solution was cooled to −60° C. in a Dry Ice-acetone bath. The reaction was carried out in an atmosphere of nitrogen in equipment which had been carefully dried and allowed to cool in a stream of nitrogen. Three ml. of a 2 N solution of isobutyl lithium in heptane was added slowly and the mixture was allowed to stir at −50 to −60° C. for three hours. The reaction mixture was allowed to warm to 0° C. and a solution of 3.3 ml. of 6 N sulfuric acid in 20 ml. of acetone was added dropwise at 0° C. Stirring was continued at 10 to 20° C. for 2.5 hours. The reaction mixture was extracted with diethyl ether and the combined ether layers were washed with saturated sodium chloride solution and dried. Evaporation of the solvent produced 6-(4-hydroxymethyl-3-cyclohexen-1(S)-yl) - 2 - methyl-4-heptanone.

EXAMPLE 13

Preparation of 4(S)-(1,5-dimethyl-(3)-oxohex-1-yl)-1-cyclohexene-1-carboxaldehyde 2.36 g. of 6-(4-hydroxymethyl-3-cyclohexen-1(S)-yl)-2-methyl-4-heptanone in 100 ml. of methylene chloride was treated with 25 g. of activated manganese dioxide and allowed to stir at room temperature for 15 hours. The reaction mixture was filtered through Celite and the filter cake was washed well with methylene chloride. Evaporation of the solvent produced 4(S)-(1,5-dimethyl-3-oxohex-1-yl)-1-cyclohexene-1-carboxaldehyde.

EXAMPLE 14

4(S)-(1,5-dimethyl - 3 - oxohex-1-yl)-1-cyclohexene-1-carboxaldehyde was oxidized to 4(S)-(1,5-dimethyl-3-oxohexyl) - 1 - cyclohexene-1-carboxylic acid [(−)-todomatuic acid] by the procedure recited in Example 7.

EXAMPLE 15

Preparation of 4-(3-hydroxy-1,5-dimethylhexyl)-1-cyclohexene-1-carboxaldehyde 24 g. of 2-[4-(R,S)-(2-hydroxy-1-methyl-1R,S-ethyl)-1-cyclohexen-1-yl]-4,5-dimethyl-1,3-dioxolane as prepared in Example 3 was dissolved in 200 ml. of pyridine and thionyl chloride (14.3 g.) was added slowly dropwise to the stirred and cooled mixture. The temperature was kept below 60° C. during the addition. The reaction mixture was allowed to stir for an additional 3–4 hours at room temperature and then was worked up by extraction with diethyl ether. The ether solution was washed with water and dried with anhydrous magnesium sulfate. Evaporation of the ether produced 2-[4-(4,5-dimethyl-1,3-dioxol-2-yl)-3-cyclohexen-1-yl]propyl chloride.

An ether solution of the above chloride compound (23 g.) was added slowly to a stirred solution of 2.2 g. of activated magnesium turnings in a flask which had been previously dried and allowed to cool under nitrogen. The reaction was carried out in an atmosphere of nitrogen. After the addition was complete, the mixture was stirred to dissolve all of the magnesium. Isovaleraldehyde (7.7 g.) was added slowly to the Grignard mixture. After the addition was complete, the mixture was heated to the reflux for 2 hours. Hydrolysis of the magnesium salt was accomplished with cold dilute sulfuric acid. The product was isolated by extraction with diethyl ether. The ether solution was washed with water, saturated sodium bicarbonate solution and water again, and dried with anhydrous sodium sulfate. Evaporation of the solvent produced 2-methyl-6[4-(4,5-dimethyl-1,3-dioxol-2-yl)-3-cyclohexen-1-yl]-4-heptanol. 2-methyl-6-[4-(4,5-dimethyl-1,3-dioxol-2-yl)-3-cyclohexen-1-yl] - 4 - heptanol was dissolved in acetone. This solution was treated with 6 N sulfuric acid at 50 to 60° C. for three hours. After this period, the reaction mixture was diluted with water and extracted with diethyl ether. The ether extracts were washed with water, dried and concentrated to yield 4-(3-hydroxy - 1,5 - dimethylhexyl)-1-cyclohexene-1-carboxaldehyde.

EXAMPLE 16

Preparation of todomatuic acid 2.3 g. of 4-(3-hydroxy-1,5-dimethylhexyl)-1-cyclohexene-1-carboxaldehyde in 25 ml. of benzene was cooled to 6° and a cold solution of 2.48 g. of sodium dichromate in 1.8 ml. of glacial acetic acid, 3.25 ml. of concentrated sulfuric acid and 10.6 ml. of water was added dropwise with stirring over a period of 4 hours with maintenance of the temperature at 6°. The reaction mixture was allowed to stir an additional two hours at 6° and then for 15 hours at room temperature. The aqueous phase was separated and extracted twice with benzene. The combined benzene layers were washed twice with water and then were extracted three times with saturated aqueous sodium bicarbonate solution. The bicarbonate extracts were made acidic with 6 N sulfuric acid and extracted with ether. The ether extracts were washed with water and dried with anhydrous magnesium sulfate. Evaporation of the solvent afforded todomatuic acid which was recrystallized from pentane.

EXAMPLE 17

Preparation of 4-(1,5-dimethyl-3-oxohexyl)-1-cyclohexene-1-carboxylic acid ethyl ester A 250-mg. sample (1.0 millimole) of 4-(1,5-dimethyl-3-oxohexyl)-1-cyclohexene-1-carboxylic acid in 0.3 ml. of ethylene dichloride was placed in a 10-ml. round-bottomed flask fitted with a magnetic stirrer and reflux condenser. Ethanol (0.175 ml.; 3.0 millimoles) and concentrated sulfuric acid (18 M) (0.003 mol.) were added. The mixture was heated with stirring to reflux for 12 hours. The mixture was poured onto ice water and the layers were separated. Extraction with ether afforded crude 4-(1,5 - dimethyl-3-oxohexyl)-1-cyclohexene-1-carboxylic acid ethyl ester which was purified by distillation at 135–140° (oil bath temperature) under 0.05 mm. pressure.

EXAMPLE 18

Preparation of (+)mentha-1(7),8-dien-2-ol by photooxygenation of d-limonene d-Limonene (0.1 mole, Eastman Chemical Co.

$[\alpha]_D = +122°$)

in 200 ml. of methanol was placed in a 250-ml. gas washing bottle fitted with a condenser. Hematoporphrin (160 mg.) was added, and a stream of dry oxygen was passed through the mixture. The mixture was irradiated with 3000A lamps in the Rayonet photo-chemical reactor for 48 hours. The mixture was concentrated to give 2-hydroperoxy-mentha-1(7),8-diene and was added dropwise with cooling and stirring to a solution of 25 g. of sodium sulfite in 150 ml. of water. The product was taken up with ether after 12 hours stirring. Distillation at 75–82° under 1.5 mm. afforded (+)-para-mentha-1(7),8-diene-2-ol.

EXAMPLE 19

Preparation of d-perillaldehyde by the oxidation of mentha-1(7),8-dien-2-ol (+) - Para-mentha - 1(7),8 - dien - 2 - ol (0.76 g., 0.005 mole) in 1 ml. of benzene was placed in a 15-ml. round-bottomed flask fitted with a magnetic stirrer and a reflux condenser. 4 ml. of 1 M sodium dichromate solution and 1.25 ml. of acetic acid were added. The mixture was heated to 70–75° (oil bath temperature) with stirring and 1.0 ml. of 20 N. sulfuric acid was added slowly over a period of two hours. When the addition of sulfuric acid was complete, the mixture was allowed to stir at this temperature for another two hours. The mixture was cooled and poured onto ice water. Extraction with ether afforded 0.60 g. of crude product which was purified by shaking with 1.13 g. of sodium sulfite, 0.80 g. of sodium bicarbonate and 5 ml. of water on a wrist-action shaker for 6 hours. The mixture was extracted twice with ether (discard) and then 6 ml. of 10% by weight of aqueous sodium hydroxide solution was added to make it alkaline. Extraction with diethyl ether afforded the crude product. Pure product was obtained by column chromatography on activity III Woelm alumina. Elution with hexane produced d-perillaldehyde.

EXAMPLE 20 d-Perillaldehyde was converted to (+)-juvabione by the procedures given in Examples 2, 3, 5–8 with the following intermediates being prepared:

2[4(R)-isopropenyl-1-cyclohexen-1-yl]4,5-dimethyl-1,3-dioxolane

2[4(R)-(2-hydroxy-1-methyl-1-ethyl)-1-cyclohexen-1-yl]-4,5-dimethyl-1,3-dioxolane (+)-3[4-(4,5-dimethyl-1,3-dioxolan-2-yl)-3-cyclohexen-1(R)-yl]butyronitrile (+)-4(R)-(1,5-dimethyl-3-oxohex-1-yl)-1-cyclohexen-1-carboxaldehyde (+)-todomatuic acid

EXAMPLE 21

Preparation of (+)-3(R,S)-[4-methyl-3-cyclohexen-1(R)-yl]-butyronitrile

A 23.2 g. sample of (+) p-menth-1-en-9-ol in 700 ml. of dry pyridine was placed in 1000-ml. round-bottomed flask fitted with a magnetic stirrer. p-Toluenesulfonyl chloride (55 g.) was added. The mixture was stirred at room temperature for three days and then was poured onto ice water. The product was taken up with diethyl ether and then the solvent was evaporated. To this residue was added 7.0 g. of sodium cyanide and 500 ml. of dimethylsulfoxide. The mixture was allowed to stir at room temperature under nitrogen for two days and was poured onto ice water. Extraction with methylene chloride produced (+) - 3(R,S) - [4 - methyl - 3 - cyclohexen-1(R)-yl]-butyronitrile as crude product which was purified by distillation at 59–64°/0.05 mm.

EXAMPLE 22

Preparation of 2-(4-methyl-3-cyclohexen-1-yl)-6-methylheptan-4-one

In a 250-ml. three-necked flask was placed 20 ml. of anhydrous diethyl ether and 50 ml. of 2 N isobutyllithium in n-heptane. A 8.0-g. sample of (+)-3(R,S)-[4-methyl-3-cyclohexen-1(R)-yl]-butyronitrile in 10 ml. of anhydrous diethyl ether was added slowly under nitrogen at 0° C. over a period of 30 minutes. The mixture was stirred at 0° for five hours. A solution of 50 ml. of 6 N sulfuric acid in 100 ml. of dioxane was added and the mixture was stirred for one hour at room temperature. The organic phase was separated and the aqueous phase was neutralized with an aqueous solution containing 10% by weight of sodium hydroxide. Extraction with diethyl ether produced crude 2-(4-methyl-3-cyclohexan-1R-yl)-6- methylheptan-4-one which was purified by column chromatography on activity III Woelm alumina.

EXAMPLE 23

Preparation of 2-methyl-6-(3-hydroxy-4-methylenecyclohexan-1R-yl)-4-heptanone

A 1.0 g. sample of 2-(4-methyl-3-cyclohexen-1(R)-yl)-6-methylheptan-4-one in 20 ml. of dry pyridine was placed in a test tube and 8 mg. of hematoporphyrin was added. The mixture was irradiated with two 15 watt fluorescent lamps while a stream of dry oxygen was passed through the solution. After irradiation for 25 hours, the mixture was diluted with ether, filtered, and the solvent was evaporated to produce 2-methyl-6-(3-hydroperoxy-4-methylenecyclohexan-1R-yl)-4-heptanone as a residue. To 0.5 g. of this residue, there was added 5.5 ml. of methanol, 4.5 ml. of anhydrous ether and a solution of 1.33 g. of potassium iodide in 8.5 ml. of acetic acid and 3 ml. of water. The resulting mixture was stirred at room temperature for four hours. The mixture was poured slowly into a solution of 20 g. of sodium bicarbonate in 70 ml. of water. Extraction with diethyl ether afforded crude 2-methyl-6-(3-hydroxy-4-methylene-cyclohexan-1R-yl)4 - heptanone which was purified by column chromatography on activity III Woelm alumina.

EXAMPLE 24

Preparation of 4(R)-(1,5-dimethyl-3-oxohex-1-yl)-1-cyclohexene-1-carboxaldehyde

A 150 mg. sample of 2-methyl-6-(3-hydroxy-4-methylene-cyclohexan-1R-yl)-4-heptanone in 0.1 ml. of benzene was placed in a 5 ml. round-bottomed flask fitted with a magnetic stirrer and a reflux condenser. A solution of 142 mg. of sodium dichromate in 0.38 ml. of water and 0.0158 ml. of acetic acid was added. The mixture was stirred at 70° C. and a solution of 116 mg. of sulfuric acid in 0.126 ml. of water was added slowly over a period of two hours. The mixtures was allowed to stir at this temperature for another two hours. Then the mixture was cooled and poured onto ice water. Extraction with diethyl ether and then chloroform produced 4(R)-(1,5-dimethyl - 3 - oxohex - 1 - yl) - 1-cyclohexene-1-carboxaldehyde.

EXAMPLE 25

Preparation of 2-methylene-5(R)-(1,5-dimethyl-3-oxohexyl)cyclohexanone

To 2.36 g. of 2-methyl-6-(3-hydroxy-4-methylenecyclohexan-1R-yl)-4-heptanone which was prepared in Example 23 in 100 ml. of anhydrous acetone, a chromic acid solution (Jones' Reagent [1]) was added dropwise with stirring and cooling to maintain the temperature at 20–25° C. until a persistent orange-brown coloration remained. After 10 minutes of stirring, the reaction mixture was diluted with water and ether. The aqueous phase was extracted three times with diethyl ether and the combined ether extracts were washed with water, saturated sodium bicarbonate solution and water again and dried with anhydrous magnesium sulfate. Evaporation of the solvent produced 2 - methylene-5(R)-(1,5-dimethyl-3-oxohexyl)cyclohexanone.

EXAMPLE 26

Preparation of 6(R)-(1,5-dimethyl-3-oxohexyl)-1-oxaspiro[2,5]-octan-4-one

To a solution of 2-methylene-5(R)-(1,5-dimethyl-3-oxohexyl)-cyclohexanone (2.36 g.) in 60 ml. of dioxane, aqueous hydrogen peroxide (30% by weight, 5 ml.) and 15 ml. of 1 N sodium hydroxide solution were added gradually and the mixture was allowed to stand at room temperature for 24 hours. The reaction mixture was diluted with water and extracted with diethyl ether. The ether extract was washed with water and dried with sodium sulfate. Evaporation of the solvent afforded 6(R)-(1,5-dimethyl-3-oxohexyl)-1-oxaspiro[2,5]octane-4-one.

EXAMPLE 27

Preparation of 4(R)-(1,5-dimethyl-3-oxohexyl)-1-cyclohexene-1-methanol 2.5 g. of 6(R)-(1,5-dimethyl-3-oxohexyl)-1-oxaspiro [2,5]-octan-4-one was treated with an excess of hydrazine hydrate (25 ml.) to form 6(R)-(1,5-dimethyl-3-oxohexyl) - 1 - oxaspiro[2,5]-octan-4-one hydrazone. This product was warmed to 90° C. for 10 minutes and then heated to reflux for 15 minutes. Nitrogen was evolved during this period. The ether solution was washed with water and dried with anhydrous sodium sulfate. Evaporation of the solvent afforded 4(R)-(1,5-dimethyl-3-oxahexyl)-1-cyclohexen-1-methanol, which was purified by column chromatography.

EXAMPLE 28

2 - [4(S)-(2-hydroxy-1-methyl-1-ethyl)-1-cyclohexene-1-yl]-1,3-dioxolane was converted to (—)-todomatuic acid by the procedure given in Examples 5, 6 and 7, and the (—)-todomatuic acid was converted to 4(S)-(1,5-dimethyl-3-oxohexyl) - 1 - cyclo-hexene-1-carboxylic acid methyl ester by the procedure given in Example 8.

EXAMPLE 29

4(R) - (1,5 - dimethyl-3-oxohex-1-yl)-1-cyclohexene-1-carboxaldehyde was converted to 4(R)-(1,5-dimethyl-3-oxohex-yl)-1-cyclohexene-1-carboxylic acid methyl ester by the procedure of Examples 6, 7 and 8.

EXAMPLE 30

4(R) - (1,5 - dimethyl-3-oxohexyl)-1-cyclohexene-1-methanol was treated in the manner of Examples 13 and 14 to produce 4(R) - (1,5 - dimethyl - 3 - oxohexyl-1-cyclohexene-1-carboxylic acid, which was then converted to 4(R)-(1,5-dimethyl-3-oxohexyl)-1-cyclohexane-1-carboxylic acid methyl ester by the procedure given in Example 8.

EXAMPLE 31

Preparation of 2-[4 R,S-isopropenyl-1-cyclohexen-1-yl]-5,5-dimethyl-1,3-dioxane

In a 2-l., round-bottomed flask, fitted with a mechanical stirrer, reflux condenser and a Dean-Stark trap, were placed 100 g. of purified d,l-perillaldehyde, 139 g. of 2,2-dimethyl-1,3-propanediol, 0.22 g. of p-toluene sulfonic acid monohydrate, 0.10 g. of hydroquinone and 1500 ml. of benzene. The reaction mixture was heated to reflux. Water was removed by azeotropic distillation. After 12 ml. of water had been collected, the mixture was allowed to cool and then poured into 3 l. of 5% by weight aqueous sodium carbonate solution. The benzene layer was separated and the aqueous layer was extracted with 3 × 300 ml. of diethyl ether. The combined organic layer was washed twice with water, dried with anhydrous sodium sulfate and evaporated to yield 2-[4, R,S-isopropenyl - 1 - cyclohexen - 1 - yl]-5,5-dimethyl-1,3-dioxane as product. This product was purified by distillation at 90–103° C./0.2 mm. Hg.

EXAMPLE 32

Preparation of a 2-[4R,S-(2-hydroxy-1-methyl-1R,S-ethyl)-1-cyclohexen-1-yl]-5,5-dimethyl-1,3-dioxane A 2-l. three-necked flask, fitted with a reflux condenser, mechanical stirrer, dropping funnel and alcohol thermomter was carefully dried and allowed to cool in an atmosphere of nitrogen. 129 g. of 2-[4 R,S-isopropenyl-1-cyclohexen-1-yl]-5,5-dimethyl-1,3-dioxane in 50 ml. of anhydrous tetrahydrofuran was placed in the flask and the solution was cooled to 0° C. The reaction was carried out at 0° C. to 2° C. in a nitrogen atmosphere, 605 ml.

---

[1] Jones' Reagent was prepared as follows: 26.7 g. of chromium trioxide was dissolved in 40 ml. of water. Concentrated sulfuric acid (23 ml.) was added and the mixture was diluted to 100 ml. with water.

of a 1 M solution of disiamylborane in tetrahydrofuran was added slowly over a period of 1 hour. After the addition, the reaction mixture was allowed to stir for 3 hours at 0° C. to 2° C. and for 1 hour at room temperature. 20 ml. of water was added to decompose any excess disiamylborane and 365 ml. of a 3N sodium hydroxide solution was added to the mixture followed by dropwise addition (with caution) of 220 ml. of 30% by weight hydrogen peroxide at 40–50° C. (there is a vigorous exothermic reaction upon addition of hydrogen peroxide). The reaction mixture was kept at 40 to 45° for 4 hours and then allowed to stir overnight. The layers were separated and the aqueous phase was extracted with 2× 300 ml. of ether. The combined organic phase was washed with saturated sodium chloride solution, dried with anhydrous sodium sulfate and evaporated to obtain the crude product 2-[4R,S-(2-hydroxy-1-methyl-1R,S-ethyl)-1-cyclohexen-1-yl]-5,5-dimethyl-1,3-dioxane.

The crude product was purified by column chromatography utilizing activated alumina equivalent to 35 times the weight of sample as an absorbent (the ratio of diameter to length of packed column was approximately 1 to 10). Benzene was the eluting solvent in the beginning; after 4 fractions (each fraction was approximately equal to the weight of absorbent used) were collected, diethyl ether was added to benzene, gradually increasing from 5% to 15%. Usually, the unreacted acetal and 3-methylbutanol-2 was contained in the first and second fractions with benzene alone and the desired product coming out with 5% diethyl ether–95% benzene (by volume) in fractions 5 to 9. Pure product was obtained by evaporation of the solvent.

EXAMPLE 33

Preparation of 3R,S-[4-(5,5-dimethyl-1,3-dioxan-2-yl)-3-cyclohexen-1R,S-yl]butyronitrile In a 2-liter, round-bottomed flask, fitted with a magnetic stirrer were placed 78 g. of 2-[4R,S-(2-hydroxy-1-methyl-1R,S-ethyl)-1-cyclohexen-1-yl]-5,5-dimethyl - 1,3-dioxane, 121 g. of p-toluenesulfonyl chloride and 925 ml. of dry pyridine. The reaction mixture was allowed to stir at room temperature for 20 hr. and then poured into a solution of 4000 ml. of cold 15% by weight aqueous hydrochloric acid. The mixture was extracted with 3×400 ml. of benzene. The benzene extracts were washed with saturated sodium chloride solution, dried with anhydrous sodium sulfate and evaporated. The remaining traces of pyridine were removed by leaving the flask under high vacuum overnight leaving the crude tosylate.

In a 2-liter, round-bottomed flask, fitted with a magnetic stirrer, reflux condenser and thermometer were placed the crude tosylate, 22 g. of sodium cyanide and 900 ml. of dimethylsulfoxide. The solution was degassed and kept under a nitrogen atmosphere. The reaction mixture was heated to 80–85° C. for 4 hr., cooled and poured into 1 liter of ice water containing 50 g. of ammonium chloride. The mixture was extracted with 3× 200 ml. of methylene chloride. The methylene chloride extracts were washed with 3× 100 ml. portions of saturated sodium chloride solution, dried with anhydrous sodium sulfate and evaporated. The crude product was purified by column chromatography: a utilizing activated alumina equivalent to 10 times the weight of sample as the absorbent. A mixture of benzene and hexane (1:1 by volume) was the eluting solvent. Pure 3R,S-[4-(5,5-dimethyl-1,3-dioxan - 2-yl)-3-cyclohexen-1R,S-yl]butyronitrile was obtained.

EXAMPLE 34

Preparation of 4-(1,5-dimethyl-3-oxohex-1-yl)-1-cyclohexene-1-carboxaldehyde

In a 2-l., three-necked flask, fitted with a mechanical stirrer, thermometer, condenser and an addition funnel, were placed 70 g. of 3R,S-[4-(5,5-dimethyl-1,3-dioxan-2-yl)-3-cyclohexen-1R,S-yl]butyronitrile and 700 ml. of anhydrous diethyl ether. The reaction flask and contents were cooled to −60 to −70° in a nitrogen atmosphere and the reaction was carried out at this temperature. 240 ml. of 1.66 M solution of isobutyl lithium in heptane was added in a period of 1 hour. The reaction mixture was stirred at −60 to −70° for 4 hours and then at 0° for a half hour. A mixture of 200 ml. of 6 N sulfuric acid in 500 ml. of acetone was added to the reaction mixture at 0°. After the addition, the reaction mixture was allowed to stir overnight at room temperature. The reaction mixture was heated to reflux for 2 hours and cooled. The layers were separated. The aqueous layer was made basic with 10% by weight aqueous sodium hydroxide solution and then extracted with ether. The combined organic phases were washed with saturated sodium bicarbonate, saturated sodium chloride, dried over sodium sulfate and evaporated.

The crude product was shaken with 50 g. of sodium sulfite 35.5 g. of sodium bicarbonate and 250 ml. of ice water on a wrist-action shaker overnight. The sulfite solution was diluted with water and extracted with 2× 50 ml. of diethyl ether. The aqueous phase was stirred with 200 ml. of diethyl ether and 200 ml. of 10% by weight aqueous sodium hydroxide and the layers were separated. The aqueous phase was stirred with an additional 50 ml. of 10% by weight aqueous sodium hydroxide and 100 ml. of diethyl ether and separated. The aqueous phase was extracted once more with 100 ml. of diethyl ether.

The combined organic extracts from the basic aqueous phase were washed with water, dried over sodium sulfate and vaporated to give 4-(1,5-dimethyl-3-oxohex-1-yl)-1-cyclohexene-1-carboxaldehyde.

EXAMPLE 35

Preparation of dl-todomatuic acid

In a 3-liter, 3-necked flask, fitted with a mechanical stirrer, thermometer and addition funnel were placed 44 g. of 4-(1,5-dimethyl-3-oxohex-1-yl)-1-cyclohexene-1-carboxaldehyde, 660 ml. of ethanol and 88 g. of silver nitrate in 176 ml. of distilled water. The mixture was cooled in an ice bath and 1450 ml. of 1.5 N sodium hydroxide solution (prepared with distilled water) was added at 0° to 5° over a period of 1 hr. The reaction mixture was allowed to stir for 1 hr. at 0° and for 2 hrs. at room temperature. The reaction mixture was filtered. The filtrate was concentrated and extracted with 2× 50 ml. of ether. The aqueous phase was acidified to pH 1 with 5 N hydrochloric acid and extracted with 3× 100 ml. of ether. The combined extracts from the aqueous acidic phase were washed with water, dried with sodium sulfate and evaporated.

The oily residue was dried under high vacuum in order to remove the last traces of solvent and finally gave a waxy solid; n-pentane was added to this residue and heated in a water bath at 60°. The pentane layer was decanted from the lower oily material. Another portion of n-pentane was added to the oily material and separated as described before. This step was repeated several times and the combined pentane layers were concentrated and allowed to stand in the ice box for crystallization. Crystals were filtered and recrystallized twice with hot n-pentane and allowed to cool at room temperature to give dl-todomatuic acid.

EXAMPLE 36

Preparation of dl-juvabione

In a 50-ml., round-bottomed flask, fitted with a magnetic stirrer and condenser, were placed 8.0 g. of dl-todomatuic acid, 3.2 g. of methanol, 10 ml. of dichloroethane and 0.1 ml. of concentrated sulfuric acid. The reaction mixture was heated to reflux for 24 hours. Layers were separated and the organic layer was washed with saturated sodium bicarbonate and water, and dried with sodium sulfate. The solvent was evaporated and the crude material was dtissled at 132–133° (0.15) mm. Hg to give dl-juvabione.

EXAMPLE 37

Preparation of 2-(1-methyl-7-oxabicyclo[4.1.0]heptan-4R-yl)-6-methyl-4-heptanone In a 500-ml. flask fitted with magnetic stirrer, thermometer, condenser and dropping funnel, a solution of 2-(4-methyl-3-cyclohexen-1R-yl)-6-methylheptan-4-one (4.5 g.; 0.02 mole) in 30 ml. of dichloromethane was placed. m-Chloroperbenzoic acid (3.85 g.; 0.022 mole) in 60 ml. of dichloromethane was added dropwise in an atmosphere of nitrogen at 23–25° over a 30-minute period. The reaction mixture was allowed to stir at this temperature for 2 hours. The excess m-chloroperbenzoic acid was destroyed with 35 ml. of 10% by weight aqueous sodium sulfite solution until a negative test was obtained with starch-iodide paper. The mixture was extracted with three 50-ml. portions of dichloromethane and the extracts were washed with 5% by weight aqueous sodium bicarbonate, water and dried with anhydrous sodium sulfate. Evaporation of the solvent gave 2-(1-methyl-7-oxabicyclo[4.1.0]heptan-4R-yl)-6-methyl-4-heptanone as product which was distilled at 102–103°/0.15 mm. Hg.

EXAMPLE 38

Preparation of 2-methyl-6-(3-hydroxy-4-methylene-cyclohexan-1R-yl)-4-heptanone

To an ice-cold solution of diethylamine (4.9 g.; 0.067 mole) in 75 ml. of tetrahydrofuran was added 43.5 ml. of a 1.6 M solution of n-butyllithium in hexane in an atmosphere of nitrogen. The reaction mixture was stirred for 30 minutes and then a solution of 2-(1-methyl-7-oxabicyclo[4.1.0]heptan - 4R-yl)-6-methyl-4-heptanone. (4.0 g.; 0.0167 mole) in tetrahydrofuran was added. The mixture was heated to reflux for 3 hours, cooled and poured into 100 ml. of ice water. The mixture was saturated with sodium chloride and the layers were separated, the aqueous layer was extracted with ether and the ether extracts were washed with saturated sodium chloride solution, and dried with sodium sulfate. Evaporation of the solvent gave 2-methyl-6-(3-hydroxy-4-methylenecyclohexan-1R-yl)-4-heptanone.

EXAMPLE 39

In the manner described in Example 38, 2-(1-methyl-7 - oxabicyclo[4.1.0]heptan-4R-yl)-6-methyl - 4 - heptanone (4.0 g.; 0.0167 mole) was treated with the lithium salt of diisopropylamine [prepared from n-butyllithium and 6.8 g. (0.067 mole) of diisopropylamine] to give 2-methyl-6-(3-hydroxy - 4 - methylenecyclohexan-1R-yl)-4-heptanone.

EXAMPLE 40

Preparation of (+)-p-mentha-1(7),8-dien-2-ol

To an ice-cold solution of diethylamine (18.25 g.; 0.25 mole) in 200 ml. of anhydrous ether was added a solution of n-butyl lithium (167 ml. of 1.5 M solution in hexane) in an atmosphere of nitrogen. The reaction mixture was stirred for 30 minutes and then a solution of (+)-limonene-1,2-oxide (15.2 g.; 0.1 mole) in 100 ml. of anhydrous ether was added. The mixture was heated to reflux for 18 hours, cooled and poured into 300 ml. of ice water. Layers were separated and the aqueous layer was extracted twice with 100-ml. portions of ether. The ether extracts were washed with 1 N hydrochloric acid, saturated aqueous sodium bicarbonate and water. The ether solution was dried with sodium sulfate and evaporated to give (+)-p-mentha-1(7),8-dien-2-ol.

EXAMPLE 41

Preparation of 4R,8R- and 4R,8Sl p-menth-1-en-9-ol

R-(+)-limonene (272.0 g.; 2.0 mole) ([α]$_D$+116°, neat) was converted into a mixture of 4R,8R- and 4R,8S-p-menth-1-en-9-ols by hydroboration with disiamylborane in the manner set forth in Example 3. The mixture of alcohols was esterified with 3,5-dinitrobenzoyl chloride in pyridine solution to give the mixture of 3,5-dinitrobenzoates after purification by filtration through a column of silica gel packed in benzene. The separation of diastereoisomers was achieved by repeated fractional crystallization from n-hexane. The less soluble 4R,8R-p-menth-1-en-9-ol had M.P. 93–95°. From the mother liquors, the more soluble 4R,8S-p-menth-1-en-9-ol, M.P. 69–71°, was obtained.

EXAMPLE 42

Preparation of 4S,8S- and 4S,8R-p-menth-1-en-9-ol

S-(−)-limonene ([α]$_D$−111°; 507 g.; 3.7 mole) upon hydroboration with disiamylborane in the manner of Example 3 afforded mixture of 4S,8S- and 4S,8R-p-menth-1-en-9-ol in 50% yield. Esterification with 3,5-dinitrobenzoyl chloride afforded the mixture of esters after purification by filtration through a silica gel column packed in benzene. Separation by fractional crystallization afforded the less soluble 4S,8S-p-menth-1-en-9-ol, M.P. 93–95°. The more soluble 4S,8R-p-menth-1-en-9-ol obtained from the mother liquors had M.P. 72–73°.

EXAMPLE 43

Preparation of (+)-3R-(4-methyl-3-cyclohexen-1R-yl)-butyronitrile (+)-4R,8S-p-menth - 1 - en-9-ol (7.0 g.; 0.0455 mole, [α]$_D$+98°) and 17.3 g. (0.091 mole) of p-toluenesulfonyl chloride in 110 ml. of dry pyridine were stirred at room temperature for 36 hours. The reaction mixture was poured into ice water and the organic material was extracted with benzene. The benzene solution was washed with 1 N hydrochloric acid and then with water, dried and evaporated to give 14.5 g. of tosylate.

The tosylate (14.5 g.; 0.047 mole) was dissolved in 150 ml. of anhydrous dimethylsulfoxide. Sodium cyanide (3.45 g.; 0.070 mole) was added to the solution and the mixture was heated with stirring to 80° for 3 hours in an atmosphere of nitrogen. The reaction mixture was poured into water containing ammonium chloride and extracted with methylene chloride. The methylene chloride layer was washed well with water, dried and evaporated to give crude (+)-3R-(4-methyl-3-cyclohexene-1R-yl)-butyronitrile. Distillation of this crude material at 74–82° (0.4 mm. Hg) afforded pure (+)-3R-(4-methyl-3-cyclohexen-1R-yl)-butyronitrile.

EXAMPLE 44

Preparation of (+)-2R-(4-methyl-3-cyclohexene-1R-yl)-6-methyl-heptan-4-one

Isobutyllithium (46.5 ml. of 1.55 M solution in heptane, 0.072 mole) and 15 ml. of anhydrous ether were placed in a 250 ml. flask fitted with a condenser, thermometer dropping funnel and magnetic stirrer which had been carefully dried and allowed to cool in an atmosphere of nitrogen. The flask and contents were cooled to 0–2° in an ice bath and a solution of (+)-3R-(4-methyl-3-cyclohexen-1R-yl)-butyronitrile (7.5 g.; 0.046 mole) in 10 ml. of anhydrous ether was added over a period of 1 hour at this temperature. The reaction mixture was stirred at 0° for 3 hours and 1 hour at room temperature. A solution of 60 ml. of 6 N sulfuric acid in 120 ml. of dioxane was added and the mixture was stirred overnight. The organic phase was separated and the aqueous phase was extracted with ether. The ether exacts were washed with saturated aqueous sodium bicarbonate solution, water and dried. Evaporation of the solvent gave crude (+)-2R-(4-methyl-3-cyclohexen-1R-yl)-6-methylheptan-4-one. This product was purified by column chromatography on activity III neutral alumina followed by distillation at 92–95° (0.2 mm. Hg).

EXAMPLE 45

Preparation of (+)-2-methyl-6R-(3-hydroxy-4-methylenecyclohexan-1R-yl)-4-heptanone A 5.0 g. sample of (+)-2R-(4-methyl-3-cyclohexen-1R-yl)-6-methyl-heptan-4-one in 120 ml. of dry pyridine was placed in a gas-washing bottle and 85 mg. of hematoporphyrin was added. The mixture was irradiated with 3500 A. light in the Rayonet photochemical reactor while a stream of dry oxygen was passed through the solution. After irradiation for 46 hours, the mixture was concentrated to give 7.0 g. of a mixture of hydroperoxides which was diluted with 70 ml. of methanol and 55 ml. of anhydrous ether. A solution of 16.8 g. of potassium iodide in 110 ml. of acetic acid and 35 ml. of water was added and the resulting mixture was stirred at room temperature for 4 hours. The mixture was poured into 400 ml. of water and extracted with benzene. The benzene extracts were washed with saturated sodium bicarbonate solution, saturated sodium thiosulfate solution, saturated sodium chloride solution and dried with anhydrous sodium sulfate.

Evaporation of the solvent gave (+)-2-methyl-6R-(3-hydroxy-4-methylenecyclohexan-1R-yl)-4-heptanone.

EXAMPLE 46

Preparation of 4R-(1R,5-dimethyl-3-oxohexyl)-1-cyclohexene-1-carboxaldehyde

A mixture containing 10 ml. of benzene and 5.7 g. of (+)-2-methyl - 6R - (3-hydroxy-4-methylenecyclohexan-1R-yl)-heptanone was placed in a 100-ml. round-bottomed flask fitted with a magnetic stirrer and a reflux condenser. A solution of 5.5 g. of sodium dichromate dihydrate in 15 ml. of water and 6.0 ml. of acetic acid was added. The mixture was stirred at 70° and a solution of 4.35 g. of sulfuric acid in 5 ml. of water was added slowly over a period of 1 hour. The mixture was allowed to stir at this temperature for another 2 hours and then was cooled and poured into ice water. Extraction with benzene produced 4R-(1R,5-dimethyl - 3 - oxohexyl)-1-cyclohexene-1-carboxaldehyde as crude product. This crude product was purified by shaking with 5.4 g. of sodium bicarbonate in 50 ml. of ice water overnight on a twist-action shaker. The mixture was diluted with water and extracted with ether. The aqueous layer was made basic with 10% by weight aqueous sodium hydroxide and then extracted with ether. Evaporation of the ether extracts from basic solution gave the pure product.

EXAMPLE 47

Preparation of (+)-4R-(1R,5-dimethyl-3-oxohexyl)-1-cyclo-hexene-1-carboxylic acid A solution was prepared by dissolving 1.2 g. (0.005 mole) of 4R-(1R,5-dimethyl-3-oxohexyl)-1-cycylohexene-1-carboxaldehyde in 15 ml. of ethanol in a 100-ml. flask and a solution of 1.0 g. of silver nitrate in 4 ml. of water was added. Aqueous sodium hydroxide (1.0 g. in 35 ml. of water) was added dropwise at 0° to 5° to the stirred reaction mixture. Stirring was continued for 1 hour at this temperature and for 2 hours at room temperature. The mixture was filtered and the filtrate was concentrated and extracted once with ether. The aqueous phase was made acidic with 5 N hydrochloric acid and extracted 3 times with ether. The latter ether extracts were combined, washed with water and dried with anhydrous sodium sulfate. Evaporation of the solvent gave (+)-4R-(1R,5-dimethyl-3-oxohexyl)-1-cyclo-hexene-1-carboxylic acid.

EXAMPLE 48

Preparation of (+) - 4R - (1R,5-dimethyl-3-oxohexyl)-1-cyclohexene-1-carboxylic acid methyl ester [(+)-epijuvabione]

A solution of 0.3 g. of (+)-4R-(1R,5-dimethyl-3-oxohexyl)-1-cyclo-hexene-1-carboxylic acid in 5 ml. of anhydrous ether was treated with 10 ml. of a 10% (w./v.) solution of diazomethane in ether. The mixture was allowed to stir for 1 hour; then 1 ml. of dilute acetic acid was added. The layers were separated and the aqueous phase was extracted with three 20-ml. portions of ether. The combined organic phase was washed with saturated sodium bicarbonate and dried with sodium sulfate. Evaporation of the solvent gave crude product which was purified by column chromatography on activity III neutral alumina followed by distillation at 0.3 mm. Hg (bath temperature 150–160°) to give (+)-epijuvabione.

EXAMPLE 49

Preparation of (+) - 4R-(1S,5-dimethyl-3-oxohexyl)-1-cyclohexene - 1 - carboxylic acid methyl ester [(+)-juvabione]

In the manner described in Examples 43–48, (+)-4R, 8R - p-menth-1-en-9-ol was converted to (+)-juvabione with the following intermediates being prepared:

(+)-3S-(4-methyl-3-cyclohexene-1R-yl)butyronitrile;
(+)-2S-(4-methyl-3-cyclohexen-1R-yl)-6-methylheptan-4-one;
(+)-2-methyl-6S-(3-hydroxy-4-methylenecyclohexan-1R-yl)-4-heptanone;
(+)-4R-(1S,5-dimethyl-3-oxohexyl)-1-cyclohexene-1-carboxaldehyde; and
(+)-4R-(1S,5-dimethyl-3-oxohexyl)-1-cyclohexene-1-carboxylic acid.

EXAMPLE 50

Preparation of (−) - 4S-(1R,5-dimethyl-3-oxohexyl)-1-cyclohexene - 1 - carboxylic acid methyl ether [(−)-juvabione]

In the manner described in Examples 43–48, (−)-4S, 8S,p - menth-1-en-9-ol was converted to (−)-juvabione with the following intermediates being prepared:

(−)-3R-(4-methyl-3-cyclohexen-1S-yl)butyronitrile;
(−)-2R-(4-methyl-3-cyclohexen-1S-yl)-6-methylheptan-4-one;
(−)-2-methyl-6R-(3-hydroxy-4-methylenecyclohexan-1S-yl)-4-heptanone;
(−)-4S-(1R,5-dimethyl-3-oxohexyl)-1-cyclohexene-1-carboxaldehyde; and
(−)-4S-(1R,5-dimethyl-3-oxohexyl)-1-cyclohexene-1-carboxylic acid.

EXAMPLE 51

Preparation of (−) - 4S - (1S,5-dimethyl-3-oxohexyl)-1-cyclohexene - 1 - carboxylic acid methyl ester [(−)-epijuvabione]

In the manner described in Examples 43–48, (−)-4S, 8R-p-menth-1-en-9-ol was converted to (−)-epijuvabione with the following intermediates being prepared:

(−)-3S-(4-methyl-3-cyclohexene-1S-yl)butyronitrile;
(−)-2S-(4-methyl-3-cyclohexen-1S-yl)-6-methylheptan-4-one;
(−)-2-methyl-6S(3-hydroxy-4-methylenecyclohexen-1S-yl)-4-heptanone;
(−)-4S-(1S,5-dimethyl-3-oxohexyl)-1-cyclohexene-1-carboxaldehyde; and
(−)-4S-(1S,5-dimethyl-3-oxohexyl)-1-cyclohexene-1-carboxylic acid.

EXAMPLE 52

Preparation of (±)-4-(1,5-dimethyl-3-oxohexyl-1-cyclohexene - 1 - carboxylic acid ethyl ester from (±)-juvabione (±)-Juvabione (2.66 g.; 0.01 mole), 50 ml. of ethanol and a drop of concentrated sulfuric acid were heated to the reflux for 3 hours. The solution was allowed to cool, and then was diluted with water and extracted with ether. The ether extracts were washed with saturated sodium bicarbonate solution and water and dried with anhydrous magnesium sulfate. Evaporation of the solvent afforded the ethyl ester which was purified by chromatography on alumina and distillation at 0.05 mm. and 135–140° (bath temperature).

We claim:

1. A compound of the formula:

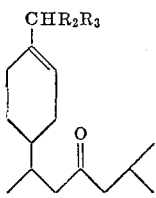

wherein $R_2$ is hydrogen and —$OR_5$ and $R_3$ is —OH, —$OR_4$ or $OR_5$, and taken together with $R_2$ form a member selected from the group consisting of oxo and lower alkylenedioxy; and $R_4$ is a lower alkanoyl, and $R_5$ is lower alkyl with the proviso that when one of $R_2$ or $R_3$ is —$OR_5$, the other is also —$OR_5$.

2. The compound of claim 1, wherein said compound is 4 - (1,5 - dimethyl-3-oxohex-1-yl)-1-cyclohexene-1-carboxaldehyde.

3. The compound of claim 2, wherein said compound is 4R(1,5 - dimethyl - 3 - oxohex-1-yl)-1-cyclohexene-1-carboxaldehyde.

4. The compound of claim 2, wherein said compound is 4R(1S,5 - dimethyl - 3-oxohex-1-yl)-1-cyclohexene-1-carboxaldehyde.

5. The compound of claim 2, wherein said compound is 4R(1R,5 - dimethyl - 3 - oxohex-1-yl)-1-cyclohexene-1-carboxaldehyde.

6. The compound of claim 1, wherein said compound is 6 - (4 - hydroxymethyl-3-cyclohexenyl)-2-methyl-4-heptanone.

References Cited

UNITED STATES PATENTS 3,492,360   1/1970   Kimel et al. _____ 260—586 X

OTHER REFERENCES

Mori et al.: "Tetrahedron Letters," 1967, (26) pp. 2515–18.

NICHOLAS S. RIZZO, Primary Examiner

J. H. TURNIPSEED, Assistant Examiner

U.S. Cl. X.R.

204—158; 260—338, 340.7, 340.9, 348, 348.5, 464, 468, 488, 514, 586, 598, 610, 611, 617, 631, 687; 424—305